Jan. 2, 1973 D. E. NASH 3,708,346
STORAGE BATTERY HEATER AND COMBINED STORAGE BATTERY AND HEATER
Filed June 17, 1971 3 Sheets-Sheet 1
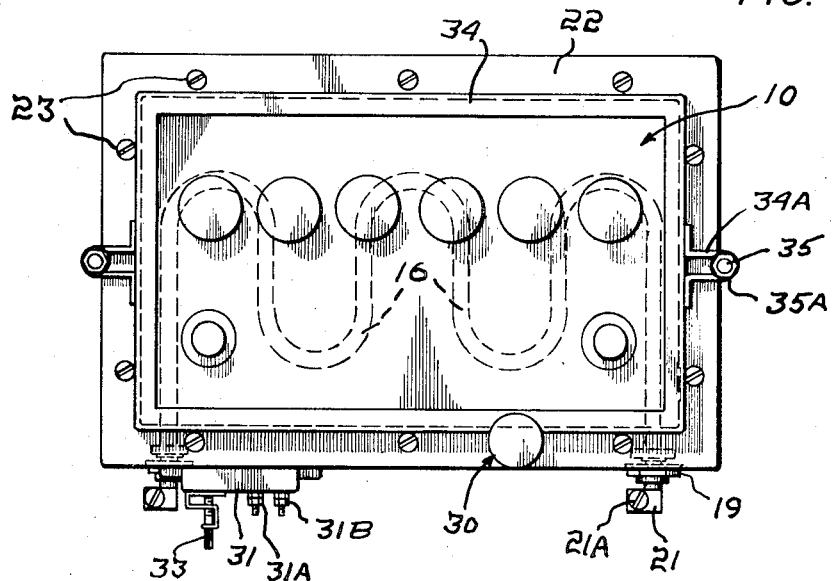
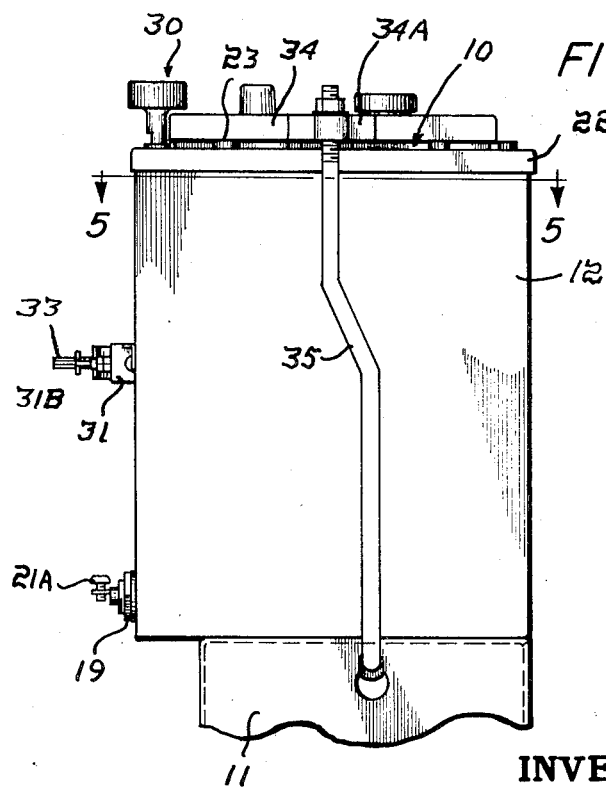
INVENTOR
DAVID E. NASH
BY
*Abbott Spear,*
ATTORNEY Jan. 2, 1973   D. E. NASH   3,708,346
STORAGE BATTERY HEATER AND COMBINED STORAGE BATTERY AND HEATER
Filed June 17, 1971   3 Sheets-Sheet 2

INVENTOR
DAVID E. NASH
BY
ATTORNEY

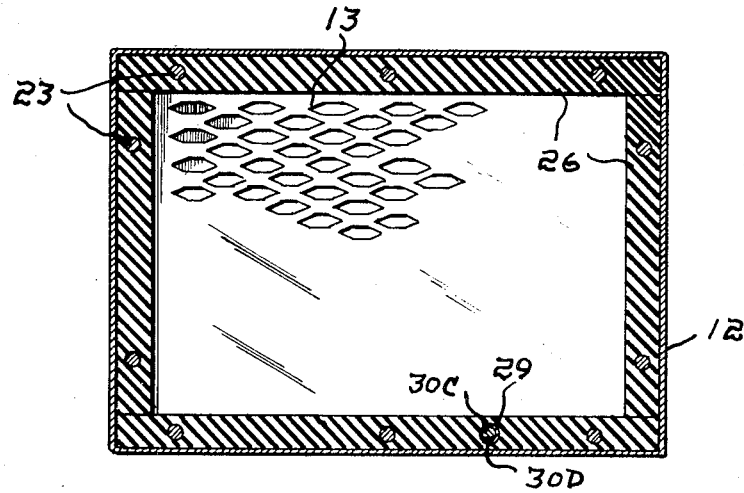
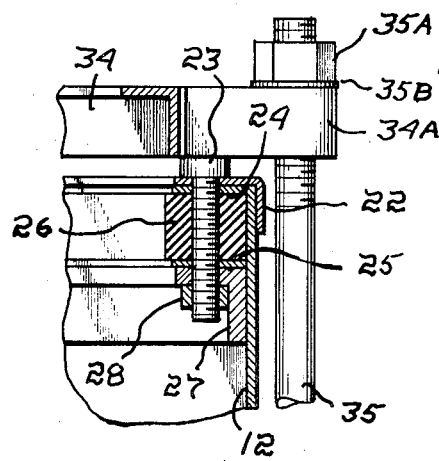
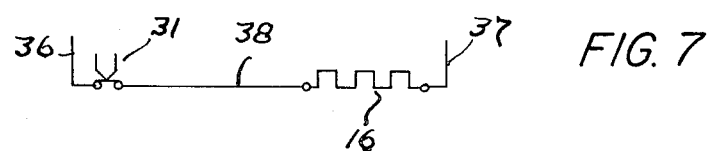
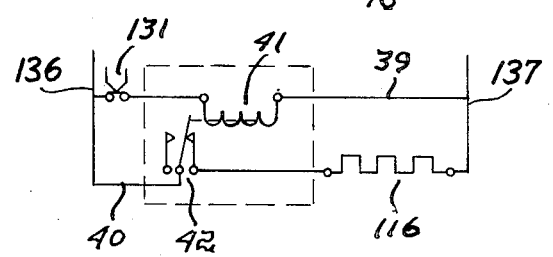

United States Patent Office 3,708,346
Patented Jan. 2, 1973

3,708,346
STORAGE BATTERY HEATER AND COMBINED STORAGE BATTERY AND HEATER
David E. Nash, Sturbridge, Mass.
(P.O. Box 219, South Berwick, Maine 03908)
Filed June 17, 1971, Ser. No. 154,128
Int. Cl. H05b 1/02, 3/06
U.S. Cl. 136—161                 9 Claims

ABSTRACT OF THE DISCLOSURE

A heater for a storage battery is disclosed which may be an integral part of a storage battery but which is shown as a casing dimensioned to receive the battery with the battery supported therein in spaced relation thereto to provide a chamber jacketing the major portion of the battery including the bottom thereof. The casing is sealed to the battery and has a filler port that may be opened to fill the chamber with antifreeze liquid. Immersion heating means within the chamber have a circuit connectable to an outside circuit and, desirably, the heater circuit includes a thermostat.

BACKGROUND OF THE INVENTION

It has long been known that lead-acid batteries lose much of their efficiency at low temperatures, a fully charged automobile storage battery having less than fifty percent of its power available at 0° F. and losing efficiency at an increasing rate as the temperature drops below that level. A battery less than fully charged is obviously even more adversely affected by low temperatures. The major drain on the storage battery of a motor vehicle is in the starting of its engine which requires more power, the colder the weather.

As a consequence, various proposals have been made to utilize electrically operated heating means that can be detachably connected to a readily available outside circuit, one approach being to heat the engine and another to heat the battery itself, the last mentioned approach being represented by U.S. Letters Patents No. 2,946,945, No. 2,761,006, and No. 3,527,925.

None of the battery heaters has, as far as I am aware, proved acceptable for, in general, prior proposals have failed to provide a construction that ensures uniform and controlled battery heating.

THE PRESENT INVENTION

The objective of the present invention is to provide battery heating means, whether incorporated as an integral part of a storage battery or as a casing to receive a conventional storage battery, operable to effect the uniform heating of the battery on a practical basis.

In accordance with the invention, this general objective is attained with a storage battery including a casing sealed to the battery in spaced relation to the sides and bottom thereof with the space between being a chamber for a liquid antifreeze that jackets the major portion of the battery and in which there is a heating means of the immersion type adapted to be detachably connected with an outside electric circuit and, desirably subject to thermostatic control.

Another general objective of the invention is to provide a casing into which a conventional battery may be inserted to provide the above referred-to chamber-defining relationship of the battery and the casing, the casing including supporting means to space the bottom of the battery above the bottom of the casing and also means releasably sealing its upper edges to the sides of the battery.

The principal difference between a battery including a heater in accordance with the invention as an integral part thereof and such a heater for use with any conventional storage battery within a predetermined size range is in the seal between the casing of the heating means. In the latter embodiment of the invention, the seal requires illustration and, accordingly, only that embodiment is illustrated in the accompanying drawings.

THE DRAWINGS

Figure 3:
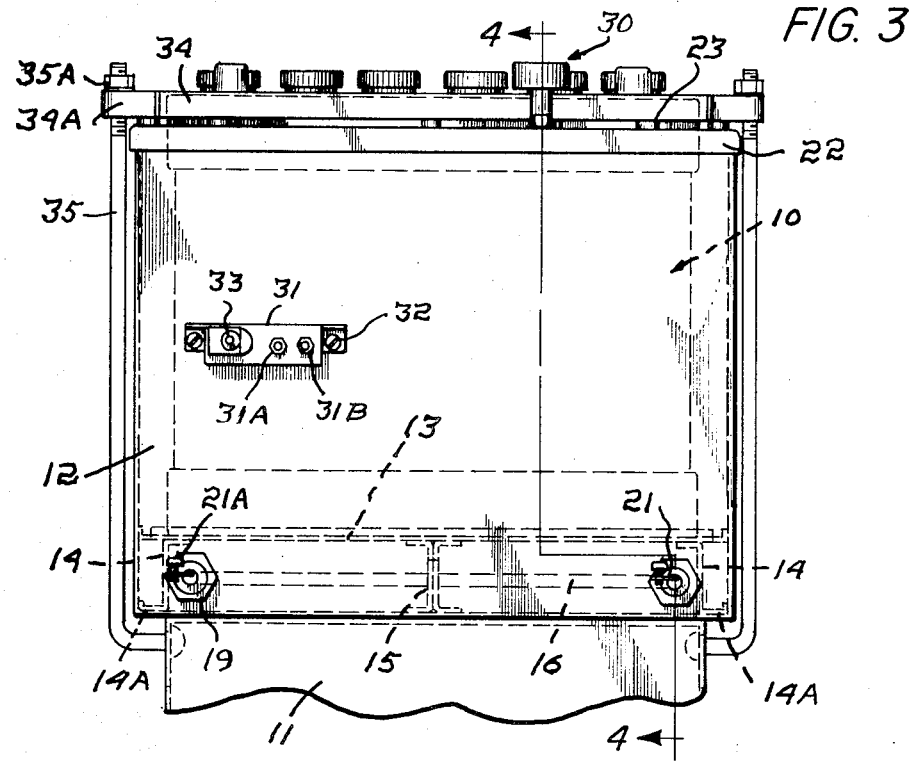
Figure 4:
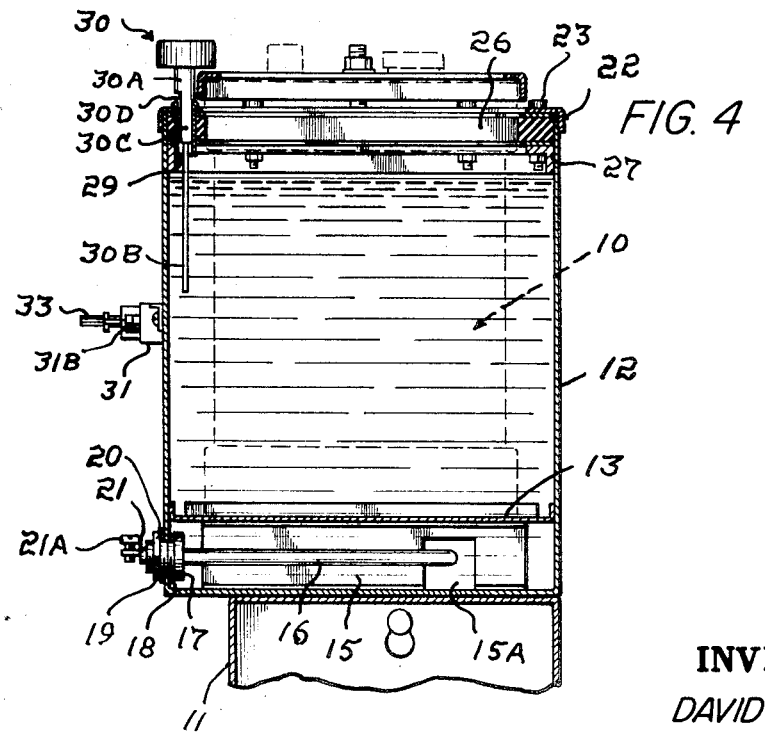

FIG. 1 is a plan view of a storage battery within a heater in accordance with the invention;
FIG. 2 is an end view thereof;
FIG. 3 is a view showing the battery and heater in side view;
FIG. 4 is a section taken approximately along the indicated lines 4—4 of FIG. 3;
FIG. 5 is a section taken approximately along the indicated lines 5—5 of FIG. 2;
FIG. 6 is a fragmentary section through the seal;
FIG. 7 is a schematic view of the heater circuit; and
FIG. 8 is a like view of a modification thereof.

In the embodiment of the invention illustrated by the drawings, a storage battery is generally indicated at 10 and as it is or may be conventional, it is not herein detailed and is largely shown only in phantom. Motor vehicles have means for detachably securing a storage battery in place with one such means being shown as a seat 11 and the battery attaching means for use therewith will subsequently be described.

The heater consists of a casing 12 dimensioned to so receive the battery that a chamber is provided for the liquid antifreeze and forming a jacket for the major portion of the contained battery 10. In order that the jacket includes the bottom of the battery, the battery 10 rests on a plate 13 having openings therein to permit free circulation of the heating liquid, conveniently of flattened, expanded sheet metal. The plate 13 has end supports 14 and a central support 15 welded to its undersurface and extending transversely of the casing 12. The margins of the plate 13 and of the outwardly disposed portions 14A of the end supports are curved upwardly to avoid sharp edges that might, in time, cut into the casing 12. The plate 13 and its supports is a unit fitting the casing 12 and resting on the bottom thereof. Desirably, the central support 15 consists of a pair of U-shaped members welded together in a back-to-back relationship.

The central support 15 has a cutout 15A, see FIG. 4, receiving the central portion of a sinuous immersion heating element 16 extending under the plate 13 substantially from end-to-end thereof. The ends of the heating element 16 extend in the same direction and are parallel and each is provided with a threaded, flanged bushing 17 extending through a hole in a side wall of the casing 12 and supporting a gasket 18 which is brought into sealing relation to the interior surface when the nut 19 threaded on each bushing 17 is suitably tightened. A washer 20 is interposed between each nut 19 and the casing 12. The exposed ends of the heating element 16 have a terminal 21 shown as of the type provided with a binding screw 21A.

The casing 12 is sealed to the sides of the battery 10 adjacent its upper edges and the means employed to accomplish such sealing may best be seen in FIG. 6. A cage frame 22 of stock that is right angular in cross section is dimensioned to encapture and stiffen the edges of the casing 12. Screws 23 extending downwardly through both sides and ends of the frame 22 pass freely through pressure strips 24 and 25, the interposed gasket length 26, and a clamping strip 27 with such parts held suspended from the frame 22 by nuts 28 threaded on the series of screws 23. Each clamping strip 27 is of stock that is right angular in cross section with its depending wall functioning as a stiffener and engaging the sides of the nuts 28 by which that strip is supported and held thereby against turning when the screws 23 are tightened to compress the gasket sections into sealing relation with the battery. It is not necessary that the resulting seal be completely leakproof. The use of separate gasket sections and pressure strips is preferred as their dimensions may be varied as required by those of the battery with which the casing is being used. All suspended parts should butt at the corners.

A bushing 29, sealed to the cage frame 22 extends freely downwardly through the gasket 26, the pressure strips 24 and 25 and the clamping strip 27 suspended therefrom, the gasket also coming into sealing contact with the bushing 29 when compressed between the pressure plates 24 and 25. The bore of the bushing 29 is closed by a plug, generally indicated at 30 and shown in FIG. 4 including an upper portion 30A, a dip stick portion 30B and an intermediate portion 30C dimensioned to fit the bore of the bushing 29. The upper portion 30A is dimensioned to provide a shoulder limiting the extent to which the plug 30 may be seated and a flat 30D extending the full length of the portion 30C and a short distance along the upper portion 30A to provide a vent allowing for expansion and contraction of the antifreeze liquid which is preferably of the permanent type.

A thermostat 31 is secured as by screws 32 to the casing 12, desirably on the same side thereof as the terminals of the heating element, below the end of the dip stick portion of the plug 30. The thermostat 31 is desirably of the adjustable type, its adjusting stem being indicated at 33 and its terminals at 31A and 31B.

In practice, the battery 10 is removed from the motor vehicle and inserted in the casing 12. The cage frame 22 and the sealing assembly suspended therefrom is placed on the upper end of the casing 12 and the screws 23 evenly tightened first to ensure the centering of the battery and then to effect the expansion of the sealing gasket 26 against the sides thereof. A hold-down frame 34 is then fitted to the top of the battery 10. Hold down bolts 35 are then attached to the base 11 in replacement of those with which the vehicle was originally equipped, the hold down bolts 35 being shaped and dimensioned to clear the casing 12 and extend upwardly through the rigid end loops 34A of the frame 34. The battery and casing are anchored by tightening nuts 35A against washers 35B seated on the loops 34A. Before use, the chamber is filled to the desired level with the antifreeze liquid.

The circuitry includes leads 36 and 37, see FIG. 7, typically from a plug, not shown, by which an outside circuit is connected thereto with one lead connected to one terminal of the heating element 16 and the other to one terminal of the thermostat 31 and with a wire 38 connecting the other thermostat terminal to the other terminal of the heating element 16.

With a garage circuit connected to the circuit of the heating element 16, the temperature of the liquid is elevated to warm the battery suitably with the thermostat interrupting the current flow to prevent overheating. Desirably, the temperature of the liquid does not exceed 100° F.

It is recognized that sizes of batteries, methods of mounting and space limitations vary with makes and models of vehicles, and many modifications will have to be made to suit specific applications, still applying the principles set forth herein. In installation, if space limitations present a problem, a remote unit provided with extra long battery cables can be installed elsewhere in the vehicle.

The battery shown in the drawings is six inches wide and ten inches long and eight inches high, the quantity of antifreeze liquid required to suitably fill the chamber is approximately 252 cubic inches or .146 cubic foot, requiring 349 watts to raise its temperature 100° F. in one hour. The heat absorption of the battery is approximately 320 watts for 100° F. in one hour, and the heat loss from the surface of the steel case accounts for 100 watts. The total wattage requirement is, accordingly, 769 watts and the heater element 16 has a rating of 1000 watts. The thermostat has a rating of 10 amps., well within the 8.33 amps. draw of this combination. For larger models of battery warmers, if the wattage requirement of a larger heating element rises beyond 1200 watts, the 10 amp. rating of the thermostat would be exceeded. In that case, the plug circuit 136, 137, see FIG. 8, includes the heating element 116 and a lead 39, and a parallel lead 40. The lead 39 has the thermostat 131 and the relay coil 41. The lead 40 includes the relay switch 42 and the heating element 116. The switch 42 is normally open and completes the circuit to the heating element 116 when closed, thus protecting the thermostat against prohibitively high current flow.

The casing 12 may be insulated, if desired, to increase efficiency. Other types of immersion heaters can be employed to heat the liquid antifreeze and other types of thermostats are available, cartridge type immersion heaters and immersion cartridge thermostats, for example.

From the foregoing, it will be apparent that the invention makes battery warming practical because the heat is uniformly applied under controlled conditions. In addition a heater that has a battery releasably positioned therein makes possible relatively low replacement cost thereof.

I claim:

1. In combination, a storage battery and a heater therefor, said heater comprising a casing including supporting structure maintaining the battery in spaced relation to the sides and bottom of the casing, the space between becoming a chamber for a heat conducting antifreeze liquid that jackets the major portion of the battery including the bottom thereof, the top edges of said casing being sealed to the sides of the battery, immersion electric heating means within the chamber and converters exteriorly thereof connectable to an electric circuit, said casing having a port opening into said chamber for use in filling the chamber with a desired amount of the antifreeze liquid, and a closure for said port.

2. The combination of claim 1 and an electric circuit connected to said connection and including a thermostat connected to the casing to be responsive to the temperature of the liquid therein.

3. The combination of claim 2 in which the circuit includes first and second parallel leads, the coil of a relay and the thermostat in the first lead, and the heater and the switch of the relay in the second lead, said switch being normally open.

4. A heater for a storage battery, said heater comprising a casing dimensioned to receive the storage battery and including supporting structure to maintain the received battery in spaced relation to the sides and bottom of the casing, the space between becoming a chamber for containing a heat conducting antifreeze liquid which jackets the major portion of the supported battery including the bottom thereof, said casing including sealing means adjustable to be brought into sealing relation to the sides of the battery, immersion electric heating means within the chamber and including connections exteriorly of the chamber connectable to an electric circuit, said chamber having a port opening therein for use in filling it with a desired amount of the antifreeze liquid, and a closure for said port.

5. The heater of claim 4 in which the sealing means includes a cage frame dimensioned to encapture the upper end of the casing, gasket means, and means suspending the gasket means from the cage frame and operable to compress the gasket means and force it into sealing engagement with the battery.

6. The heater of claim 5 in which the suspending means includes pressure plates between which the gasket means are located, clamping means, screws extending downwardly from the cage frame, and nuts threaded on the free ends of the screws and in engagement with the clamping means to connect the suspending means to the cage frame as a unit.

7. The heater of claim 6 in which the gasket, the clamping means, and the pressure plates are frames.

8. The heater of claim 7 in which each of the gasket and pressure plate frames consists of separate lengths butting at the corners.

9. The heater of claim 4 in which the supporting structure includes a plate having openings to permit the circulation of the liquid therethrough and underlying supports spacing the plate from the bottom of the casing without blocking liquid flow under the plate, and the immersion heater is located under the plate and traverses the supported zones.

References Cited

UNITED STATES PATENTS

| | | | |
|---|---|---|---|
| 3,110,633 | 11/1963 | Bachmann | 136—161 |
| 3,012,088 | 12/1961 | Grady et al. | 136—161 |
| 1,266,780 | 5/1918 | Edison | 136—161 |
| 1,508,371 | 9/1924 | Krieger | 136—161 |
| 2,418,792 | 4/1947 | Riggs | 136—161 |
| 2,440,369 | 4/1948 | Furman | 136—161 |
| 3,440,109 | 4/1969 | Plattner | 136—161 |
| 3,609,297 | 9/1971 | Christopoulus | 219—439 |

FOREIGN PATENTS

| | | | |
|---|---|---|---|
| 820,555 | 9/1959 | Great Britain | 219—439 |
| 808,963 | 2/1959 | Great Britain | 136—161 |

VOLODYMYR Y. MAYEWSKY, Primary Examiner

U.S. Cl. X.R.

219—439, 521, 530